Dec. 24, 1935. C. C. BISHOFF 2,025,635
PROTECTOR FOR DRIVE SHAFT JOINTS
Filed Jan. 15, 1932  2 Sheets-Sheet 2
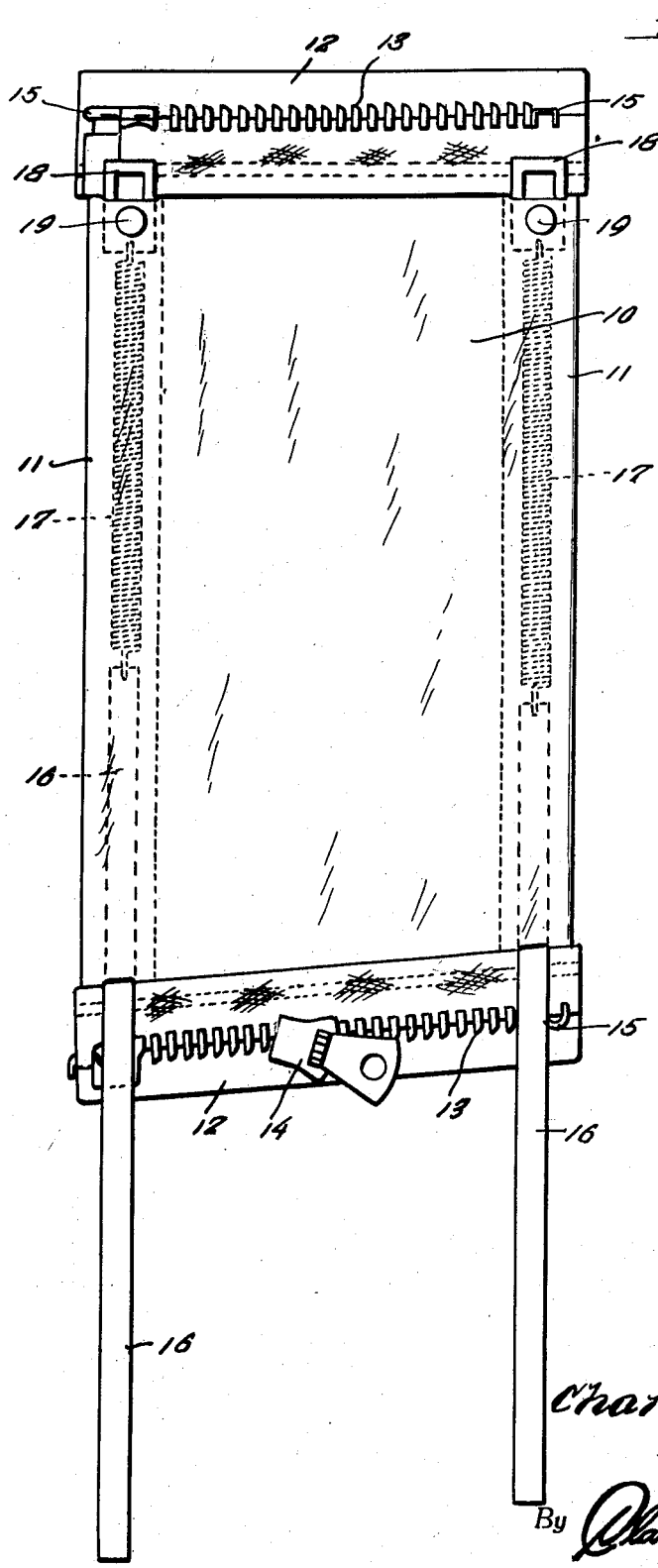
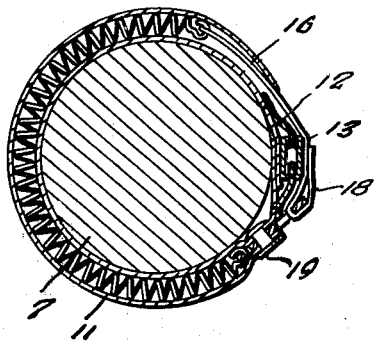
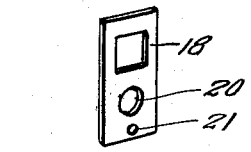
Inventor
Charles C. Bishoff
By Clarence A. O'Brien
Attorney

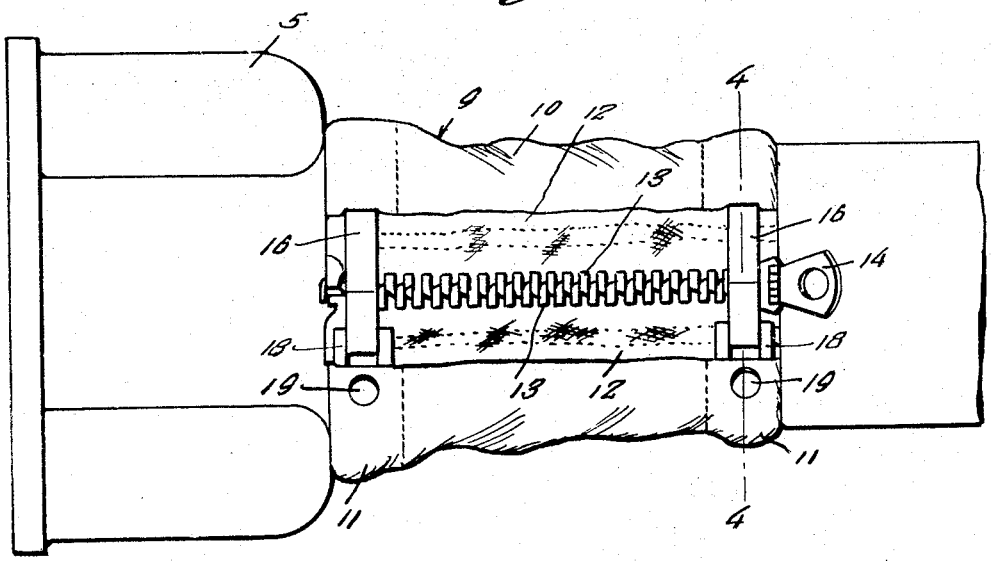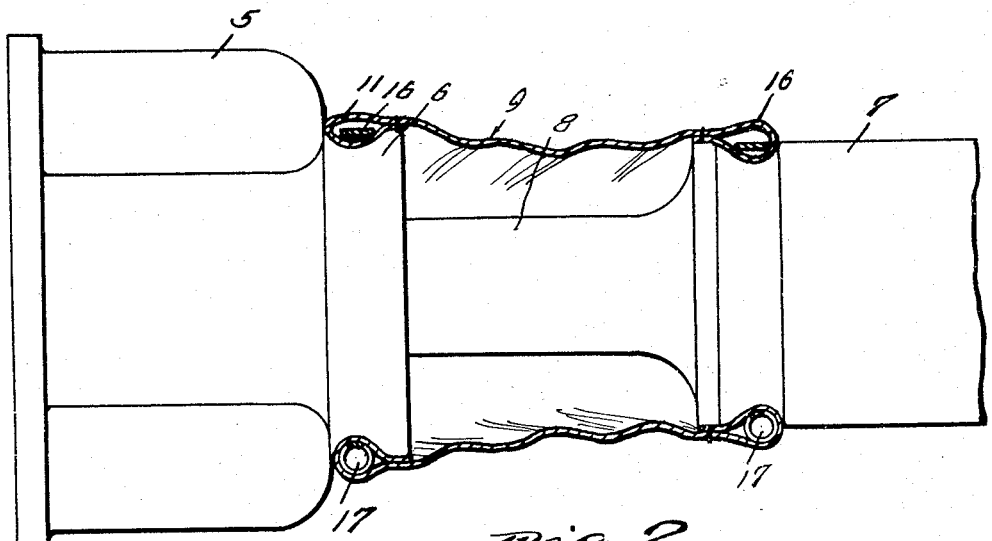

UNITED STATES PATENT OFFICE 2,025,635

PROTECTOR FOR DRIVE SHAFT JOINTS

Charles C. Bishoff, Fairmont, W. Va.

Application January 15, 1932, Serial No. 586,942

3 Claims. (Cl. 64—32)

This invention appertains to new and useful improvements in coverings in the form of protectors for the universal joints of drive shafts, and is especially adapted for use on the drive shafts of automobiles.

Such protectors are quite general in use on different makes of automobiles, and they frequently require replacement. This job of replacing these protectors is quite tedious and the service charge is quite high in most establishments.

It is therefore one of the principal objects of this invention to provide a shaft joint covering which can be rapidly removed and replaced with equal rapidity.

Another important object of the invention is to provide a protector in the form of a covering for shaft joints which can be manufactured and sold at low cost.

These and other important objects and advantages of the invention will become apparent to the reader of the following specification.

In the drawings;—

Figure 1 represents a top plan view of the covering installed over a joint.

Fig. 2 represents a longitudinal sectional view through the protector.

Fig. 3 represents a top plan view of the covering in stretched position.

Fig. 4 represents a cross sectional view taken substantially on line 4—4 of Fig. 1.

Fig. 5 represents a perspective view of one of the side members.

Referring to the drawings wherein like numerals designate like parts, it can be seen that numeral 5 represents the drive side of the coupling which is in the form of a socket having a reduced shoulder 6, while number 7 represents the driven side of the joint with the male element 8 projecting into the socket structure 5.

The protector which is generally referred to by numeral 9 bridges the space between the shaft 7 and the collar 6 and serves to prevent dust and grit from mingling with the grease on the element 8 and furthermore to maintain an efficient supply of grease at all times in contact with the element 8 so that it will always maintain the interior of the socket structure 5 thoroughly lubricated.

This covering 9 consists of a substantially rectangular sheet 10 of leather, suede, or some other suitable material having hems 11—11 along the longitudinal edge portions thereof. These hems are open at their ends and it is preferable that one end of the sheet 10 be cut off on a bias in view of the difference in diameters between the collar 6 and the shaft 7 which occurs in most automobile drive mechanisms, but of course this is immaterial and the sheet may, for other accommodations be perfectly rectangular.

Each end of the sheet 10 is provided with a reinforced transversely disposed strip 12 and on these strips 12—12 are complementary rows of fastening elements 13, which when brought together in the manner shown in Fig. 4, form one form of the well known multiple fastener type of closure, the sliding connector being denoted by numeral 14.

Numeral 15 is a guide member which when the fastening assemblies are set together will serve to guide the connector 14 into a position where it can by being slid longitudinally of the strips 12—12 connect the fastening elements 13 together. Numeral 15 represents an abutment on each strip 12 for stopping the sliding connector 14 when it has connected the ends of the sheet 20 in the manner shown in Fig. 1.

Projecting into each hem 11 is a ductile metallic strip 16, which inside of the hem connects to one end of a coiled extensible spring 17.

At the remaining end of each hem, an eye member 18 is permanently secured by a rivet 19 which passes through an opening 20 therein. Each of these eye members 18 is also provided with a small opening 21 for receiving the remaining end of the corresponding spring 17.

It can now be seen, that in applying the protector, the sheet 10 is wrapped around the joint so that the longitudinal edge portion, more specifically the hems 11—11 will circumscribe the shoulder 6 and the adjacent end of the shaft 7. The strips 16 are now pulled a substantial distance outwardly and inserted through the eyes 18 and this operation obviously tensions the springs 17 so that the longitudinal edge portions of the sheet 10 firmly grip the shoulder 6 and adjacent end of the shaft 7.

As is clearly shown in Fig. 1, it will be observed that one of the strips 16 passes over one of the reinforcing strips or bindings 12 inwardly of the slidable connector 14 when the protector is in applied position, so that there is no likelihood of the connector 14 riding backwardly along the binders 12—12 to open the multiple fastener.

These strips 16 are of ductile material so that after they are disposed through the eyes 18 they can be bent backwardly and will remain in this position.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. In combination, a wrapper, securing means for the wrapper, said means comprising an extensible spring, securing means attaching one end of the spring to the wrapper, a ductile strap extending from the opposite end of the spring, and an eyelet at the secured end of the spring for receiving the said ductile strap.

2. In combination, a wrapper having hems at its edges, and a securing means for the wrapper at each of said edges, each of said securing means comprising an extensible spring in one of the hems, securing means attaching one end of the spring to the wrapper, a ductile strap extending from the opposite end of the spring and through the hem, and an eyelet at the secured end of the spring for receiving the said ductile strap.

3. In combination, a wrapper having hems at its edges, means for detachably connecting the ends of the wrapper, and a securing means for the wrapper at each of the said edges, each of said securing means comprising an extensible spring in one of the hems, securing means attaching one end of the spring to the wrapper, a ductile strap extending from the opposite end of the spring and through the hem, and an eyelet at the secured end of the spring for receiving said ductile strap.

CHARLES C. BISHOFF.